(12) United States Patent
Adamiecki et al.

(10) Patent No.: US 7,782,520 B2
(45) Date of Patent: Aug. 24, 2010

(54) DUOBINARY MODULATION WITH A LUMPED-ELEMENT MACH-ZEHNDER DEVICE

(75) Inventors: Andrew Adamiecki, Morganville, NJ (US); Sethumadhavan Chandrasekhar, Matawan, NJ (US); Christopher Doerr, Middletown, NJ (US); David Nielson, Old Bridge, NJ (US); Peter Winzer, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 11/617,350

(22) Filed: Dec. 28, 2006

(65) Prior Publication Data
US 2008/0158643 A1 Jul. 3, 2008

(51) Int. Cl.
*G02F 1/01* (2006.01)
*G02F 1/295* (2006.01)

(52) U.S. Cl. ................ 359/279; 385/4; 385/8

(58) Field of Classification Search ........... 359/279; 385/8, 4
See application file for complete search history.

(56) References Cited

U.S. PATENT DOCUMENTS

| | | | |
|---|---|---|---|
| 6,188,497 B1 * | 2/2001 | Franck et al. | 398/183 |
| 6,836,185 B1 * | 12/2004 | Pobanz | 330/260 |
| 2004/0151511 A1 * | 8/2004 | Gill et al. | 398/183 |

OTHER PUBLICATIONS

Gill et al.; "42.7-Gb/s Cost-Effective Duobinary Optical Transmitter Using a Commercial 10-Gb/s Mach-Zehnder Modulator With Optical Filter"; Apr. 2005; Photonics Technology Letters, IEEE; vol. 17, Issue: 4; pp. 917-919.*

* cited by examiner

*Primary Examiner*—Uyen-Chau N Le
*Assistant Examiner*—Kajli Prince
(74) *Attorney, Agent, or Firm*—Brosemer, Kolefas & Associates, LLC

(57) ABSTRACT

Duobinary and NRZ modulation of an X-Gb/s optical signal is achieved with a lumped element InP Mach-Zehnder device configured to operate at X/k-Gb/s where k>1 and arranged in a push-pull configuration.

11 Claims, 9 Drawing Sheets

3(a)

3(b)

3(c)

6(a)

6(b)

6(c)

7(a)

7(b)

7(c)

7(d)

7(e)

DUOBINARY MODULATION WITH A LUMPED-ELEMENT MACH-ZEHNDER DEVICE

FIELD OF THE INVENTION

This invention relates generally to the field of optical communications and in particular to the generation of duobinary and Non-Return-To-Zero (NRZ) optical signals with a nonlinear, lumped-element InP Mach-Zehnder structure.

BACKGROUND OF THE INVENTION

One impediment to the widespread adoption of 40-Gb/s optical transmission systems is the absence of a transponder exhibiting cost, footprint and power characteristics superior to those exhibited by 4×10-Gb/s systems.

SUMMARY OF THE INVENTION

In accordance with the principles of the invention, we describe a compact, lumped-element electrode InP Mach-Zehnder device capable of sustained 42.7-Gb/s operation constructed from a transmitter intended for 10 Gb/s operation. Both optical duobinary (DB) and optically-equalized non-return-to-zero (NRZ) formats yield excellent results.

Accordingly, one aspect of the present invention is applicable to a method for generating a duobinary optical signal at a bit rate of X-Gb/sec through the use of a non-linear lumped element Mach-Zehnder device designed to be operated at a bit rate of X/k-Gb/sec where k>1. In this inventive manner, relatively high-yield, low cost devices may be used to generate high-quality signals having formats and bit rates of substantial interest. Subsequent filtering of these signals further improves their desirable characteristics.

Viewed from another aspect, the present invention is applicable to a method for generating non-return-to-zero (NRZ) signals.

Viewed from yet another aspect, the present invention is applicable to a method of filtering duobinary signals.

BRIEF DESCRIPTION OF THE DRAWING

A more complete understanding of the present invention may be realized by reference to the accompanying drawing in which.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

According to one aspect of the invention, 42.7-Gb/s operation of a lumped-element electrode InP Mach-Zehnder modulator (MZM) originally intended for 10.7-Gb/s is described. This MZM exhibits a steeper frequency roll-off beyond 15 GHz than an equivalent travelling-wave design.

Figure 1:
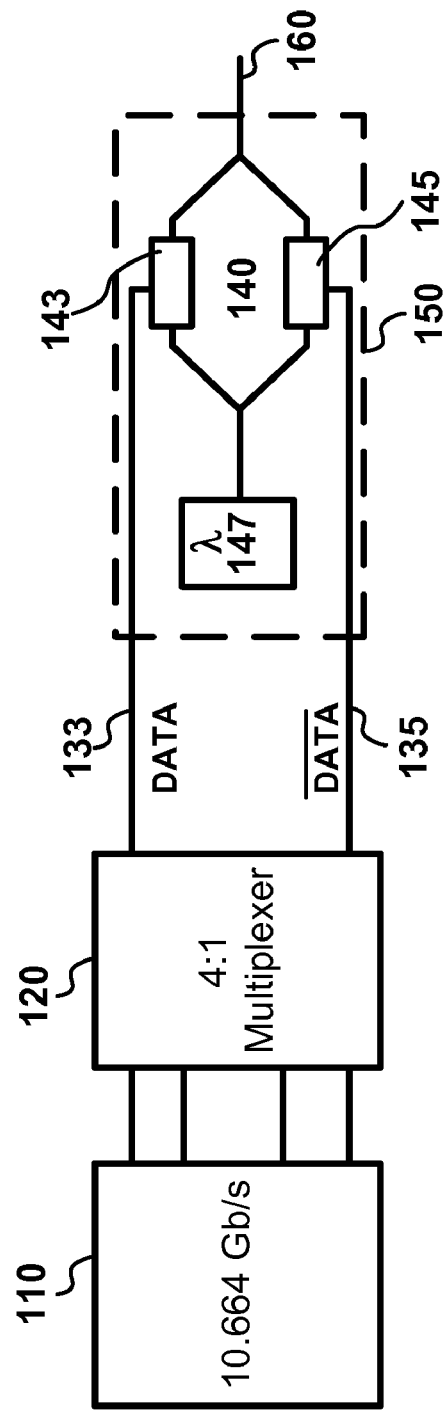
FIG. 1 is a schematic block diagram of a lumped-element InP Mach-Zehnder modulator according to the present invention.

Turning now to FIG. 1, there is shown a schematic block diagram of an exemplary, lumped element, InP Mach-Zehnder modulator according to the present invention. More particularly—and for exemplary purposes—a number of 10.664 Gb/s signals 110 are applied to a 4:1 multiplexer 120 which outputs the multiplexed 10.664 signals 110 as 42.7-Gb/s signals 133 and 135 which represent DATA, and $\overline{\text{DATA}}$ respectively and which are applied to a respective electrodes 143, 145 each disposed on a respective arm of a Mach-Zehnder modulator 140 (MZM).

As shown in this FIG. 1—and according to a preferred embodiment—the Mach-Zehnder modulator MZM 140 has lumped-element electrodes, 143, 145 which those skilled in the art will readily appreciate enable small size, low cost and high yield manufacture, yet exhibit a steeper frequency roll-off beyond ~15 GHz than the more involved travelling-wave electrode approaches designed to operate at substantially 40 Gb/s.

Figure 2:
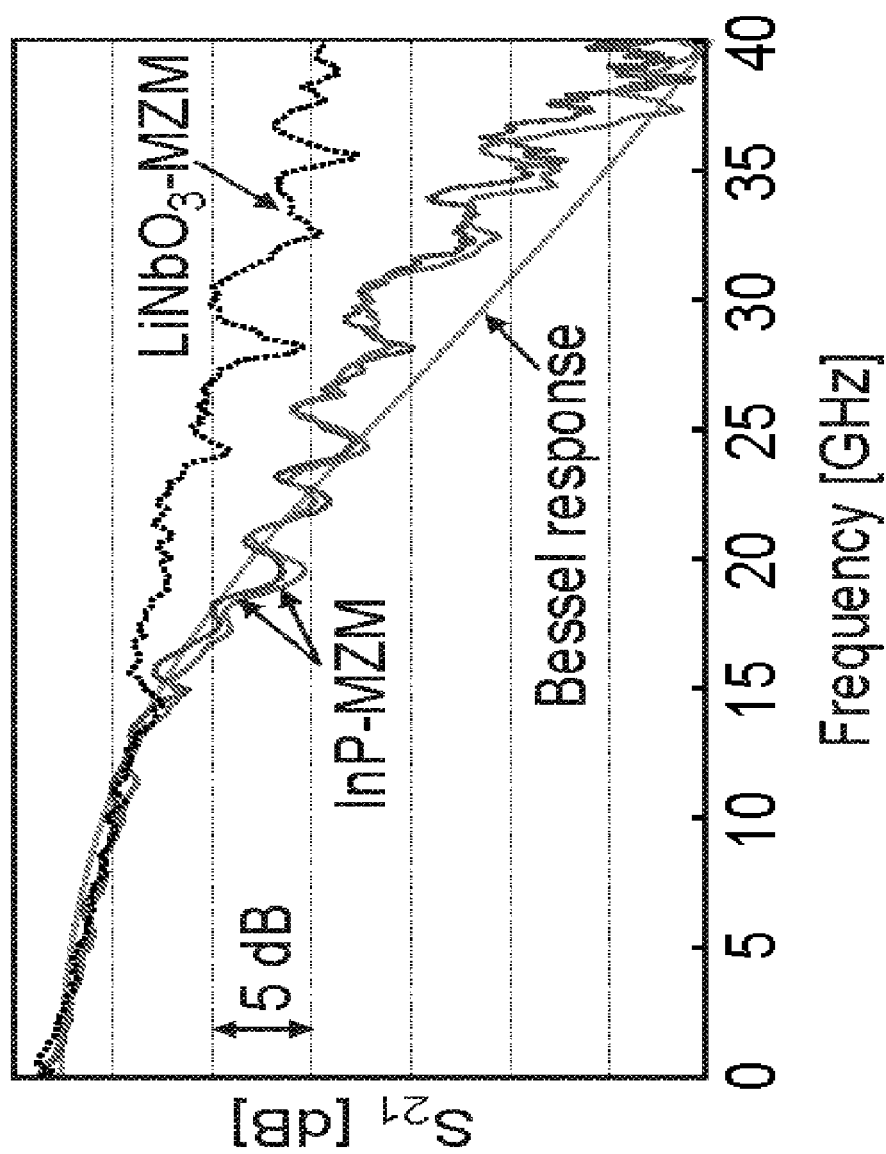
FIG. 2 is a graph showing the electro-optic transfer function of the InP structure according to the present invention along with a comparison to a traveling-wave design as well as an ideal $5^{th}$ order Bessel transfer function.

FIG. 2 shows the electro-optic transfer characteristics (input-to-output scattering parameter $S_{21}$) of the two MZM arms, and contrasts them to a travelling-wave $LiNbO_3$ device with similar 3-dB bandwidth, rated for 10.7-Gb/s operation. The dc switching voltage of the device was $V_\pi=2.3$ V, and the dc extinction ratio was 16 dB, since—in the exemplary embodiment—the MZM splitting ratios were tailored to optimize negative chirp performance at 10 Gb/s. The cw output power of the DFB-MZM module 150 was +7 dBm.

Optical duobinary modulation at 42.7-Gb/s is achieved by biasing the modulator at maximum extinction and directly applying a 42.7-Gb/s bit sequence, we simultaneously used the MZM as a duobinary low-pass filter and as a modulator. As is evident from FIG. 2, the steeper roll-off of the InP MZM compared to a LiNbO$_3$ travelling-wave design better matches a 5$^{th}$-order Bessel low-pass characteristics of ~12 GHz 3-dB bandwidth, known to be well suited for 42.7-Gb/s duobinary filtering. The 42.7-Gb/s bit sequence was generated by multiplexing four properly delayed copies of a 10.7-Gb/s $2^{31}-1$ pseudo-random bit sequence. The modulator was driven in push-pull operation with a differential drive voltage of 7 V$_{pp}$ (3.5 V$_{pp}$ on each MZM arm).

Figure 3:
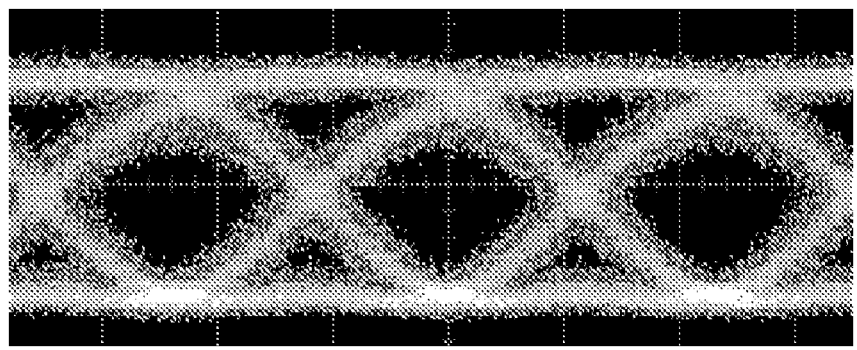
FIG. 3 is a series of graphs showing both (a) unfiltered and (b) filtered 42.7-Gb/s optical duobinary eyes and (c) spectra before (3c-a) and after (3c-b) receive-side filtering by a 100/50-GHz Wavelength Division Multiplexed interleaver.
Figure 3:
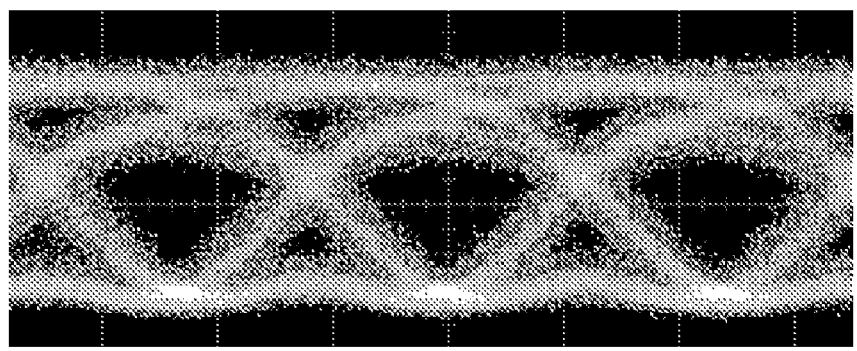
Figure 3:
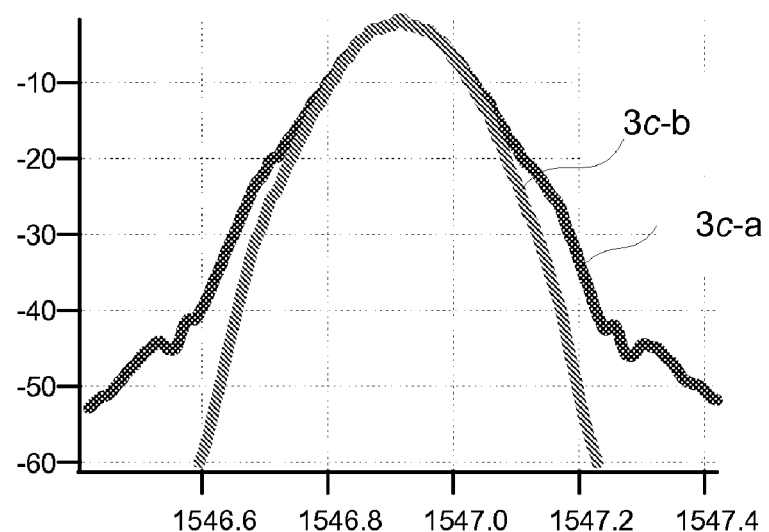

FIG. 3 shows the resulting eye diagrams in which FIG. 3(a) is straight out of the modulator and FIG. 3(b) is after optical filtering by a 100/50-GHz wavelength-division multiplexing (WDM) interleaver having a 43-GHz 3-dB bandwidth. FIG. 3(c) shows the optical spectra before (3c-a) and after (3c-b) optical filtering. As can be readily appreciated, the interleaver suppresses higher-frequency spectral components, which are sub-optimally filtered by the MZM's non-ideal low-pass characteristics.

Figure 4:
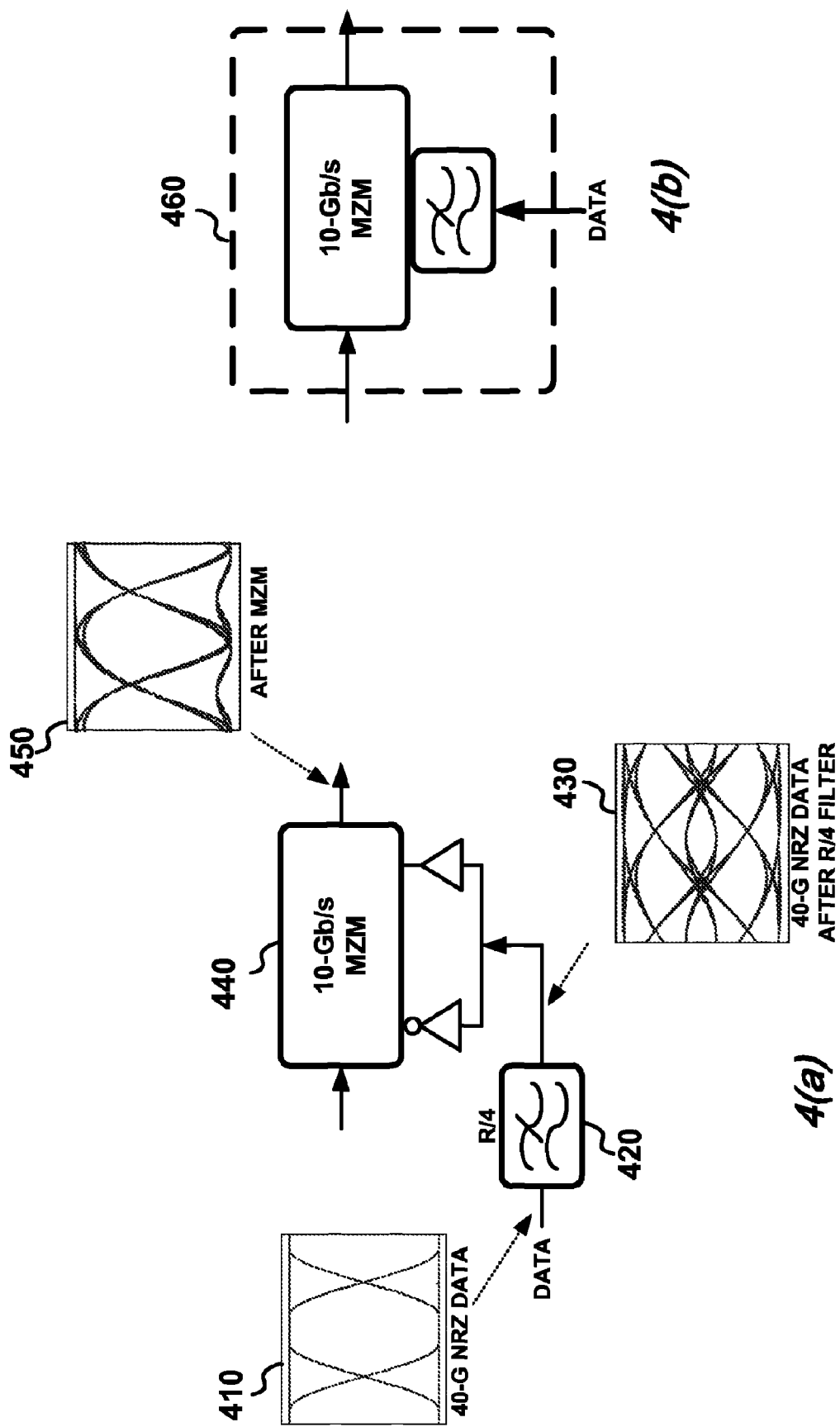
FIG. 4 is a block diagram showing (a) general optical duobinary filtering and (b) modulation according to the present invention.

An overview of this operation may be quickly understood with reference to FIG. 4, which in block diagram form shows this optical duobinary filtering and modulation according to the present invention. In particular, in FIG. 4(a), a 40G NRZ input data signal 410 is applied to a R/4 filter 420 which results in a filtered 40G signal 430. This filtered 40G signal is applied to the arms of the 10-Gb/s MZM 440 thereby resulting in an optical intensity as depicted in diagram 450. In this inventive manner, the 10-Gb/s MZM modulator 460 acts as a duobinary filter for 40-Gb/s NRZ signals 470 (FIG. 4(b)).

Figure 5:
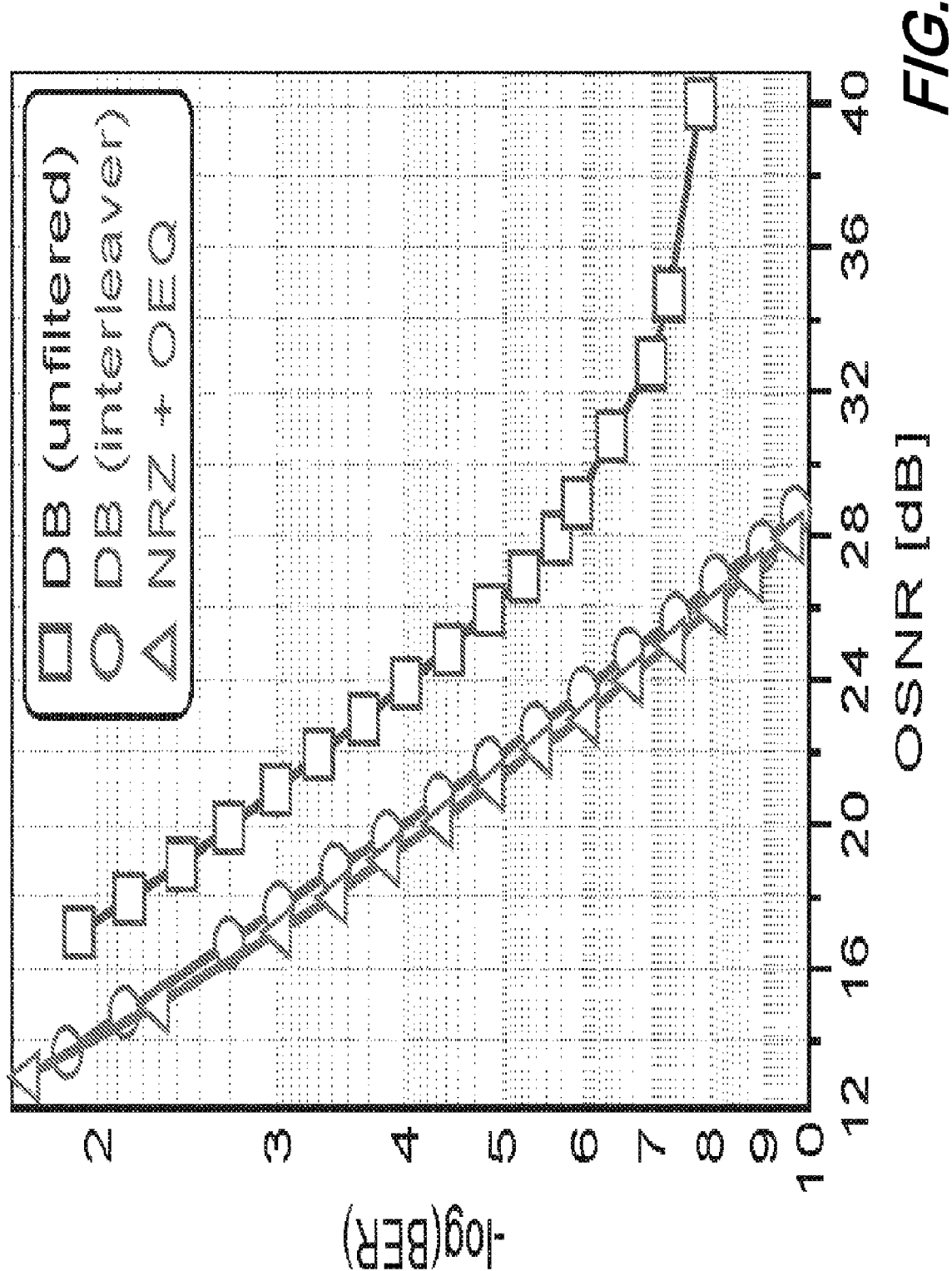
FIG. 5 is a graph showing BER vs. OSNR for optically unfiltered (squares) and filtered (circles) duobinary as well as optically equalized NRZ (triangles), all at 42.7 Gb/s.

Turning now to FIG. 5 there it shows the bit error ratio (BER) as a function of the optical signal-to-noise ratio (OSNR, 0.1-nm reference bandwidth, both noise polarizations), as measured with a beat-noise limited receiver of 40-GHz electrical bandwidth. The squares and circles represent the optically unfiltered (1.2-nm optical receiver bandwidth) and the interleaver-filtered DB signal, respectively. As shown, optical filtering not only eliminates an error floor at BER~$10^{-8}$, but also lowers the required OSNR at BER=$10^{-3}$ from 21 dB to 17.7 dB; both values demonstrate excellent performance[6].

Figure 6:
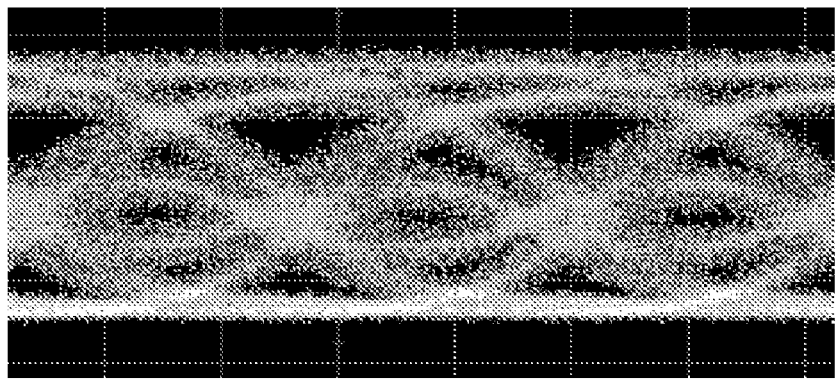
FIG. 6 is a series of graphs showing 42.7-Gb/s NRZ eye diagrams (6a and 6b) and spectra before (solid) and after (dashed) optical equalization, respectively.
Figure 6:
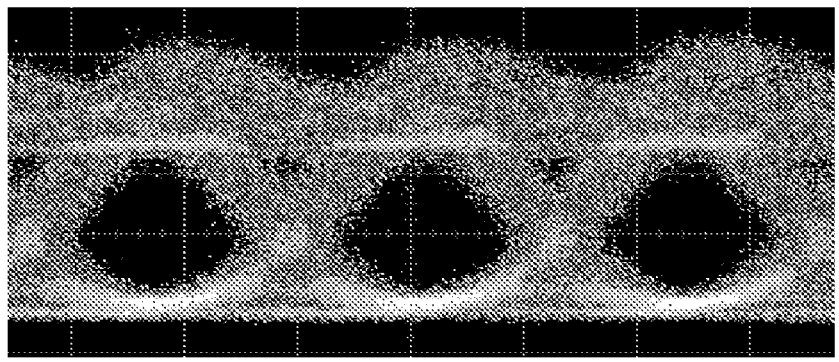
Figure 6:
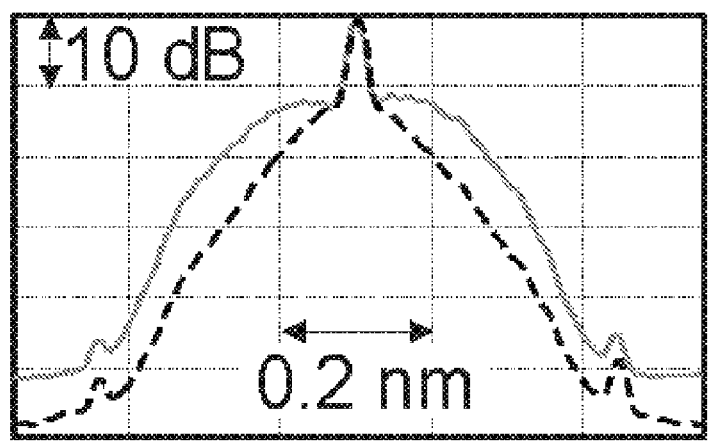

Biasing the modulator at quadrature, and driving it with the same 42.7-Gb/s bit sequence as described above, but at a reduced differential drive voltage swing of 3.5 V$_{pp}$ (1.75 V$_{pp}$ on each MZM arm), a heavily low-pass filtered NRZ signal exhibiting an almost closed eye as shown in FIG. 6(a) was generated. Using a two-tap optical feed-forward equalizer (OEQ), the NRZ signal was restored to that shown in FIG. 6(b). FIG. 6(c) shows the spectra before (solid) and after (dashed) the OEQ, evidencing the restoration of high-frequency spectral components.

For our demonstrative purposes, the OEQ employed was fabricated in 0.80% index contrast Si:SiO$_2$ planar lightwave circuit technology. A tap delay of 20 ps, shorter than the bit duration of 23.4 ps, enhances OEQ performance and allows for simultaneous equalization of multiple 50-GHz (or 100-GHz) spaced WDM channels. The device has a 4-dB fiber-to-fiber insertion loss. Being fully passive, pre-emphasis of high-frequency signal components comes at the expense of attenuating the carrier, which leads to a 9-dB reduction in average signal power, compensated by transmit amplification.

Figure 7:
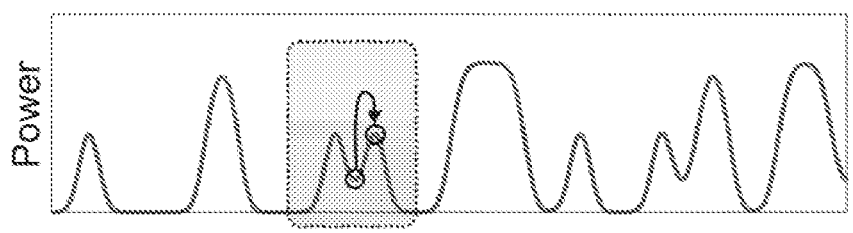
FIG. 7 shows schematically FIG. 7(a)-FIG. 7(c) the equalization process, FIG. 7(d) the optical equalizer employed, and FIG. 7(e) the operations and stages of the equalizer.
Figure 7:
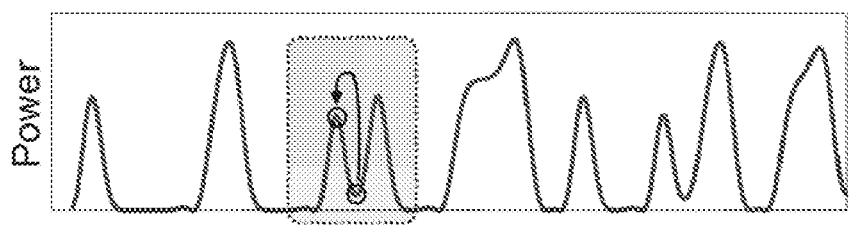
Figure 7:
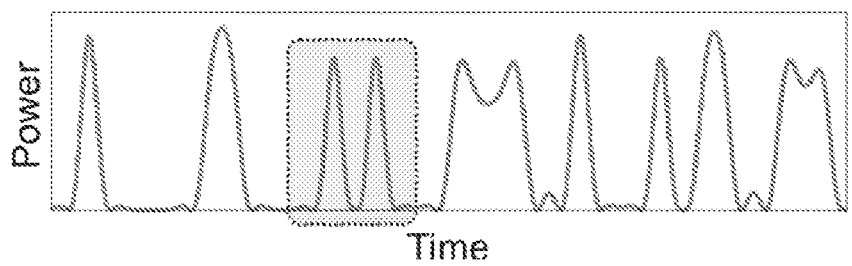
Figure 7:
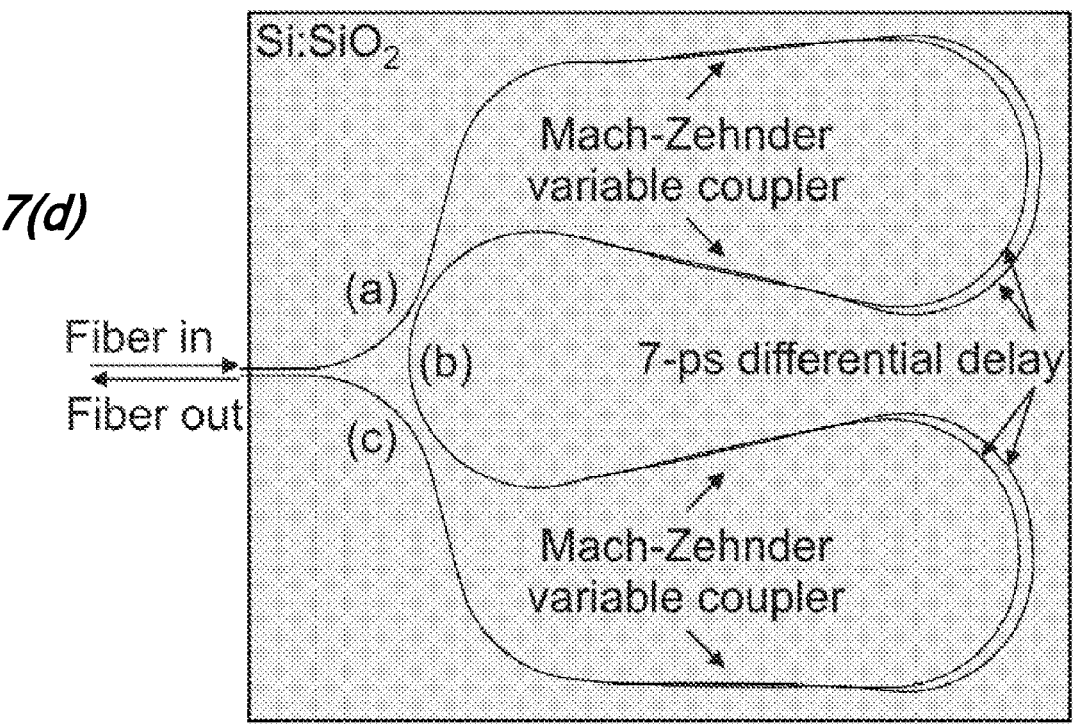
Figure 7:
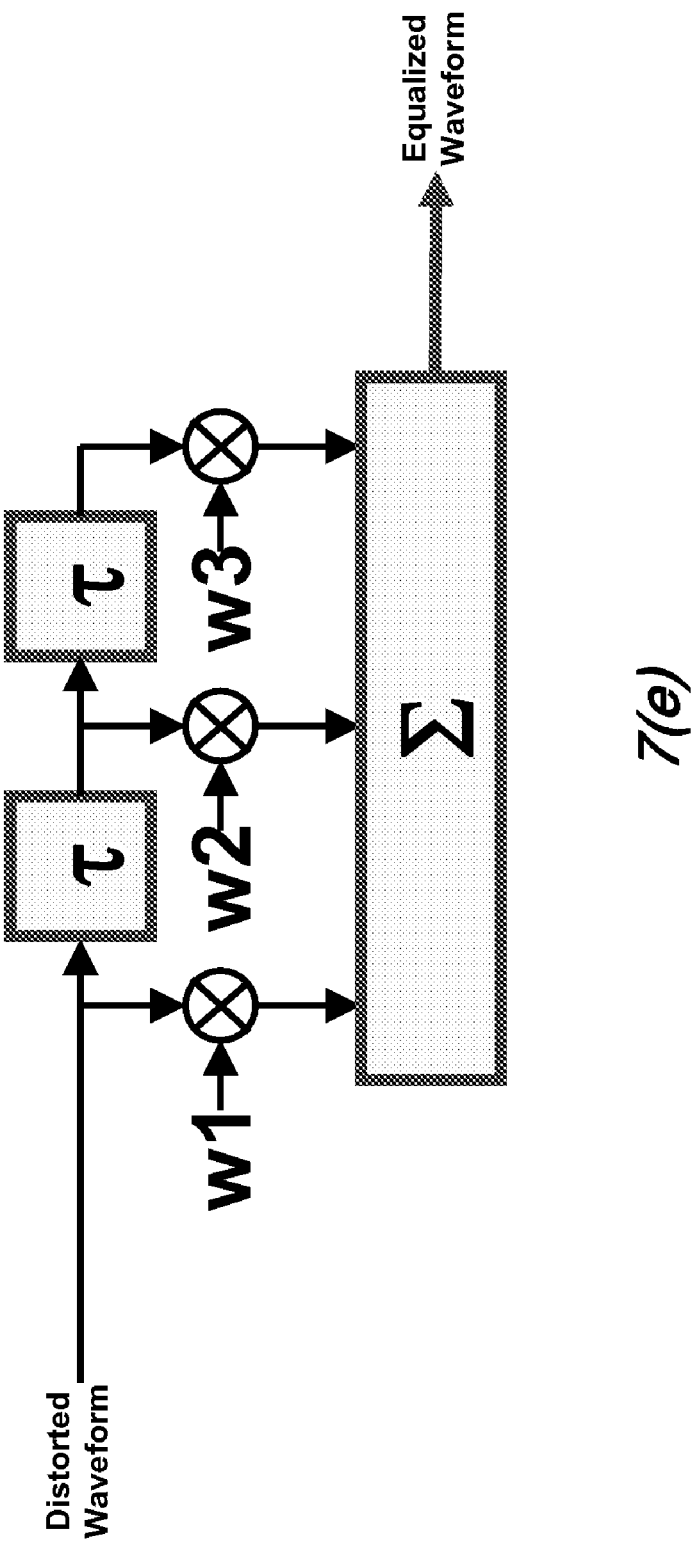

FIG. 7 shows schematically the operation of the equalization filter. In particular FIG. 7(e) shows a distorted waveform applied to an input of the equalization filter is "cleaned up" by the successive stages of the filter to produce the equalized waveform output therefrom. Operationally, the equalization has the effect of removing energy from the '0'-bits of the waveform and relocating that energy to the '1'-bits. This operation is shown schematically in FIG. 7(a), FIG. 7(b) and FIG. 7(c) which correspond to the waveform upon input, after the first stage and after the second stage of the equalization filter, respectively. FIG. 7(d) is a schematic of the Si:SiO$_2$ planar lightwave circuit described above wherein (a), (b), and (c) denote the approximate locations of waveforms FIG. 7(a), FIG. 7(b) and FIG. 7(c) within its structure.

Turning our attention now back to FIG. 5, the BER performance of the optically equalized NRZ signal is shown. A back-to-back required OSNR of 17 dB at BER=$10^{-3}$ was achieved, which is only 0.5 dB worse than the performance of an optimised 42.7-Gb/s LiNbO$_3$-based NRZ transmitter in the same receiver setup.

Figure 8:
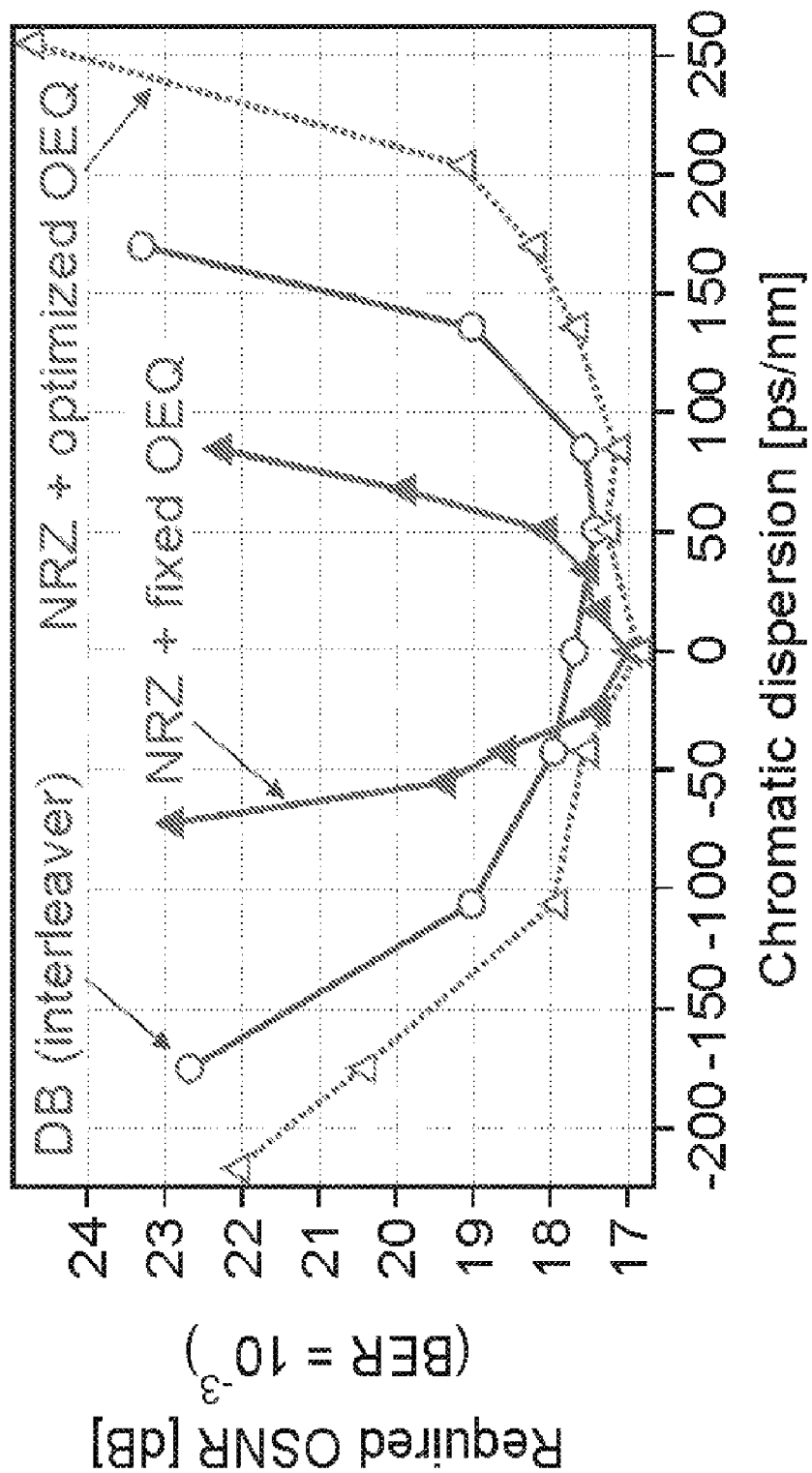
FIG. 8 is a graph showing chromatic dispersion tolerance of optically filtered duobinary (circles) and optically equalized NRZ with fixed (solid triangles) and with dispersion-optimized OEQ (open triangles).

The chromatic dispersion tolerance of the present invention may be understood with reference to FIG. 8. In particular, FIG. 8 shows the dispersion tolerance (required OSNR for BER=$10^{-3}$) of duobinary modulation filtered by the 100/50-GHz interleaver (circles) as well as of the optically equalized NRZ signal with fixed (back-to-back optimised) OEQ settings (open triangles) and with the OEQ optimised separately for each dispersion point (solid triangles). The modulator chirp due to the finite extinction ratio of the MZM is evident from the asymmetry of the penalty curves. The full width of the dispersion window at 2 dB OSNR penalty amounts to 110 ps/nm for NRZ with fixed OEQ, 330 ps/nm for NRZ with dispersion-optimized OEQ, and 255 ps/nm for DB. The dispersion tolerance for NRZ matches or exceeds reported data using 42.7-Gb/s rated LiNbO$_3$ modulators. The tolerance for optically filtered DB is slightly lower than the expected ~300-ps/nm window, which we mainly attribute to residual modulator chirp.

At this point, those skilled in the art will appreciate the significance of our operation of a 10.7-Gb/s highly integrated lumped-element electrode InP MZM at 42.7 Gb/s using duobinary and optically equalized NRZ signals. In addition, duobinary features lower optical complexity, little modulation insertion loss, and a large dispersion tolerance, at the modest expense of slightly higher drive voltage requirements, although lower drive voltages can advantageously be used a the expense of increased insertion loss. Optically equalized NRZ modulation needs lower drive voltages at the expense of an additional optical component; the OEQ lends itself to integration and can be shared among WDM channels. The back-to-back sensitivities as well as the dispersion tolerances are comparable to those obtained from 42.7-Gb/s rated LiNbO$_3$ modulators.

At this point, while we have discussed and described our invention using some specific examples, those skilled in the art will recognize that our teachings are not so limited. In particular, while we have discussed an operation of the invention at particular rates (i.e., 10.7 Gb/s devices having 42.7 Gb/s bit sequences applied thereto, our invention may advantageously operate with other variations of rated operation rate of the Mach-Zehnder and applied bit rates. Accordingly, our invention should be only limited by the scope of the claims attached hereto.

What is claimed is:

1. A modulation method for an optical signal comprising the steps of:

applying a substantially X-Gb/s bit sequence to an input of a X/k-Gb/s non-linear, lumped-element InP Mach-Zehnder Modulator, where k is >1; and generating through the effect of lumped-electrode low-pass filtering of the Mach-Zehnder modulator a substantially X-Gb/s output signal, wherein X is the bit rate in Gb/s of the applied bit sequence and the output signal and X/k is the bit rate in Gb/s at which the modulator is configured to operate.

2. The method of claim 1 further comprising the step of:

biasing the Mach-Zehnder modulator at substantially maximum extinction such that the substantially X-Gb/s output signal exhibits a duobinary format.

3. The method of claim 2, further comprising the step of:

filtering the output signal with an optical filter to reduce undesirable signal characteristics resulting from imperfections of the lumped-element low-pass filtering within the Mach-Zehnder modulator, such that signal components of the output signal outside a predetermined frequency band are removed.

4. The method of claim 1 further comprising the steps of:

biasing the lumped-element Mach-Zehnder modulator at quadrature such that the generated X-Gb/s output signal exhibits substantially NRZ format; and optically equalizing the NRZ format X-Gb/s output signal.

5. A modulation method for an optical signal comprising the steps of:

applying a substantially 40-Gb/s bit sequence to an input of a 10-Gb/s non-linear, lumped-element InP Mach-Zehnder Modulator; and generating through the effect of lumped-electrode low-pass filtering of the InP Mach-Zehnder modulator a substantially 40-Gb/s output signal.

6. A modulation method for an optical signal comprising the steps of:

applying a substantially 42.7-Gb/s bit sequence to an input of a 10.7-Gb/s non-linear, lumped-element Mach-Zehnder Modulator; and generating through the effect of lumped-electrode low-pass filtering of the Mach-Zehnder modulator a substantially 42.7-Gb/s output signal.

7. A method of operating a non-linear InP Mach-Zehnder optical modulator having first and second waveguide arms corresponding to first and second lumped-element electrodes respectively, said non-linear InP Mach-Zehnder modulator being configured to operate at X/k-Gb/s where k is >1, said method comprising the steps of:

applying a substantially X-Gb/s bit sequence (DATA) to one of the lumped-element electrodes;

applying a substantially X-Gb/s bit sequence ($\overline{\text{DATA}}$) to the other one of the lumped-element electrodes; and operating said non-linear InP Mach-Zehnder modulator at maximum extinction, such that through the effect of low-pass filtering by the lumped-element electrodes, it generates an X-Gb/s output signal in duobinary format, wherein X is the bit rate in Gb/s of the applied bit sequences and the output signal and X/k is the bit rate in Gb/s at which the Mach-Zehnder modulator is configured to operate.

8. The method claim 7 wherein said Mach-Zehnder modulator is biased at quadrature such that it generates an X-Gb/s output signal exhibiting NRZ format, said method further comprising the step of:

optically equalizing the X-Gb/s NRZ output signal.

9. The method of claim 7 further comprising the step of:

filtering the X-Gb/s duobinary output signal thereby reducing undesirable signal characteristics resulting from imperfections of the lumped-element low-pass filtering within the Mach-Zehnder modulator, such that signal components of the output signal outside a predetermined frequency band are removed.

10. A method of operating a non-linear InP Mach-Zehnder optical modulator having first and second waveguide arms corresponding to first and second lumped-element electrodes respectively, said InP Mach-Zehnder modulator being configured to operate at 10-Gb/s, said method comprising the steps of:

applying a substantially 40-Gb/s bit sequence (DATA) to one of the lumped-element electrodes;

applying a substantially 40-Gb/s bit sequence ($\overline{\text{DATA}}$) to the other one of the lumped-element electrodes; and operating said non-linear InP Mach-Zehnder modulator at maximum extinction such that a substantially 40-Gb/s output signal in duobinary format is produced.

11. A method of operating a non-linear InP Mach-Zehnder optical modulator having first and second waveguide arms corresponding to first and second lumped-element electrodes respectively, said InP Mach-Zehnder modulator being rated to operate at substantially 10.7-Gb/s, said method comprising the steps of:

applying a substantially 42.7-Gb/s bit sequence (DATA) to one of the lumped-element electrodes;

applying a substantially 42.7-Gb/s bit sequence ($\overline{\text{DATA}}$) to the other one of the lumped-element electrodes; and operating said non-linear InP Mach-Zehnder modulator at maximum extinction such that a substantially 42.7-Gb/s output signal in duobinary format is produced.

* * * * *

UNITED STATES PATENT AND TRADEMARK OFFICE
CERTIFICATE OF CORRECTION

| | | |
|---|---|---|
| PATENT NO. | : 7,782,520 B2 | Page 1 of 1 |
| APPLICATION NO. | : 11/617350 | |
| DATED | : August 24, 2010 | |
| INVENTOR(S) | : Adamiecki et al. | |

It is certified that error appears in the above-identified patent and that said Letters Patent is hereby corrected as shown below:

Title Page item 75
In the inventors change "David Nielson" to -- David Neilson --.

Signed and Sealed this
Eighth Day of November, 2011

David J. Kappos
*Director of the United States Patent and Trademark Office*